UNITED STATES PATENT OFFICE.

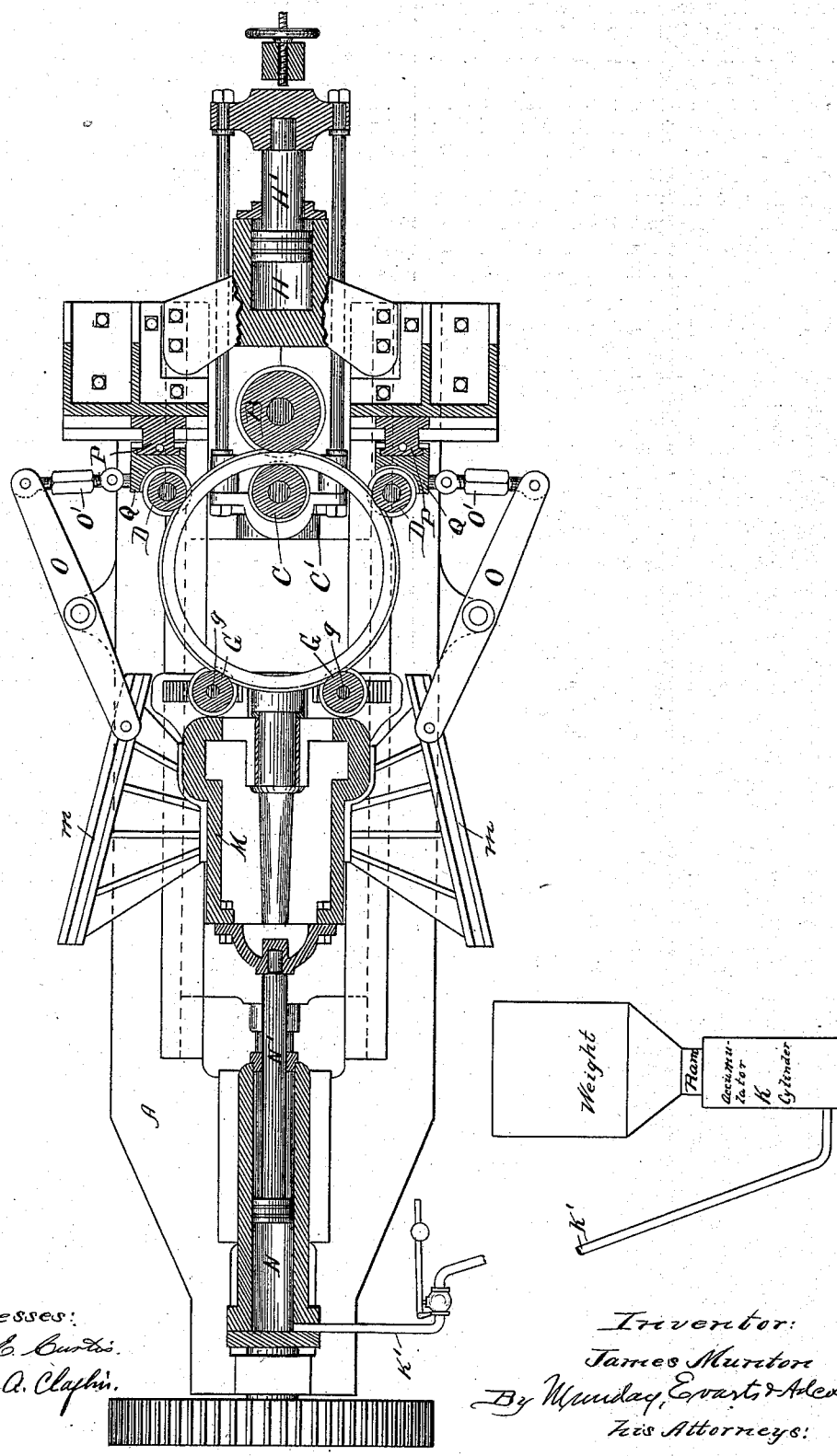

JAMES MUNTON, OF MAYWOOD, ASSIGNOR TO HIMSELF, AND CHARLES H. FERRY, OF CHICAGO, ILLINOIS.

PROCESS OF ROLLING TIRES.

SPECIFICATION forming part of Letters Patent No. 416,798, dated December 10, 1889.

Application filed August 5, 1889. Serial No. 319,824. (No model.)

*To all whom it may concern:*

Be it known that I, JAMES MUNTON, a citizen of the United States, residing in Maywood, in the county of Cook and State of Illinois, have invented a new and useful Improvement in the Art or Process of Rolling Tires Outward, or from a smaller to a larger diameter, of which the following is a specification.

My invention relates to the art of rolling tires or rings outward, or from a smaller to a greater diameter.

Heretofore it has been customary in rolling tires outward, or from a smaller to a greater diameter, to adjust from time to time the position of the guide-rolls, which are ordinarily located adjacent to the main or exterior driven roll in a tire-mill. However frequently the operator turns the adjusting-screws or otherwise adjusts the position of the guide-rolls, it is practically impossible for him to move the guide-rolls in accordance with the rate at which the diameter of the tire is increased by the action of the working-rolls, especially as this rate of increase is liable to constant variations during the process of rolling, owing to the particular condition of the tire or bloom, its temperature, dimensions, &c. Great difficulty is therefore practically experienced in keeping the tires or rings in a true circular shape, and this difficulty is rather aggravated than diminished by the use of a pair of exterior pressure-rolls at the opposite diameter of the tire from the ordinary guide-rolls, as the keeping of this additional pair of exterior rolls in proper position by adjusting or moving them from time to time as the tire expands in diameter is equally difficult with the adjustment of the ordinary guide-rolls, and of course doubles the work.

In the tire-mill which has been heretofore patented to me in Letters Patent Nos. 363,843 and 401,713, the two additional exterior pressure-rolls above referred to as being located opposite the ordinary guide-rolls are employed; and I have in the practical operation of the mill in rolling tires outward, or to a greater diameter, experienced considerable difficulty in keeping these additional exterior pressure-rolls in proper relation to the tire as it expands in size or diameter. I have, however, discovered a method or process of operating which obviates all difficulty, and by which I am enabled not only to save the labor of one man, (to wit, the operator, who heretofore has controlled the movement of the slide carrying the additional exterior pressure-rolls,) but also to keep the tires or rings of a perfectly true circular form during the whole process of rolling.

The method or process which I have discovered and now use consists in rolling the tire outward against the constant and yielding pressure of the two exterior rolls opposite the main driven exterior rolls, such exterior pressure-rolls being caused to recede by the tire itself as it expands in diameter, so that they are continuously and automatically adjusted to the varying size or diameter of the tire by the tire itself, and the ordinary guide-rolls are in like manner caused to recede or adjust themselves. By thus rolling the tire outward against the pressure of exterior rolls, which are caused to recede by the tire itself as it increases in diameter, the position of the exterior or guide rolls is accurately, continually, and automatically adjusted, so that the tire is always preserved of true circular shape, and at the same time I am enabled to dispense with the attendant or operator or operators whose business it has heretofore been to keep the guide and exterior rolls in adjustment. The yielding pressure on the exterior or guide rolls and against which the tire is rolled outward may be exerted by any suitable means. I preferably employ hydraulic pressure exerted in the usual way by a hydraulic cylinder and piston. The pressure I ordinarily use is about three hundred and fifty pounds to the square inch; but this of course may be greatly varied, according to the strength, temperature, and size in cross-section of the tire or ring being rolled. I ordinarily use simply the pressure of the accumulator commonly employed in tire-rolling mills; but hydraulic pressure from a pump may of course be employed. The pressure may be regulated, according to the strength of the tire, by any suitable means or by a safety-valve.

In practicing my improved process the mill which I prefer to use is that described in my patents, before referred to, and in my application, Serial No. 319,823, filed August 5, 1889.

In the accompanying drawings I have shown a horizontal section of the mill which is shown and described in my application above referred to, as this is what I believe to be the best construction of mill now known to me for practicing my present improvement. For a full description of this mill I would refer to the specification and drawings of my said application, and to the patent thereon to be granted.

In the drawings, A represents the frame or bed of the mill; B, the main exterior driven roll; C, the inside pressure-roll; D D, the ordinary guide-rolls; G G, the exterior pressure-rolls; M, the slide upon which they are mounted; N N', the hydraulic cylinder and piston for exerting the yielding pressure on the slide M. The pressure of the hydraulic piston N' is also exerted upon the guide-rolls D D by means of the cams $m$ on the slide M, and the levers O and pivoted links O' connected to the laterally-moving slides P P.

Q Q are vertically-adjustable slides connected to the lateral slides P P.

H H' is the hydraulic cylinder and piston for operating the slide C', upon which the inside pressure-roll C is mounted.

K represents the accumulator, and K' the pipe or connection between the accumulator and the hydraulic cylinder N, by which the pressure of the accumulator is communicated to the piston N'.

The inside pressure-roll C being forced against the tire under powerful pressure, and the main exterior roll B being driven in the usual manner, the tire is rolled outward, or to a larger diameter, and as the tire increases in size it causes the exterior rolls G G D D to recede against the less and yielding pressure of the hydraulic cylinder and piston N N'. It will be observed that all the exterior rolls G G D D are connected together, so as to move uniformly by means of the slide M and its cams $m\ m$, levers O, and links O'.

I make no claim in this application to the mechanism shown and described herein as suitable for use in practicing my process, as that forms the subject of my pending application, Serial No. 319,823, filed August 5, 1889.

I claim—

The process or method of rolling tires or rings outward, or from a smaller to a larger diameter, against the yielding and continuous pressure of exterior rolls, which are caused to recede and adjust themselves automatically by the expansion of the tire itself as it increases in diameter, substantially as described.

JAMES MUNTON.

Witnesses:
H. M. MUNDAY,
EDMUND ADCOCK.